C. A. WOOLSEY.
MILK CRATE.
APPLICATION FILED OCT. 31, 1921.
1,433,327.
Patented Oct. 24, 1922.
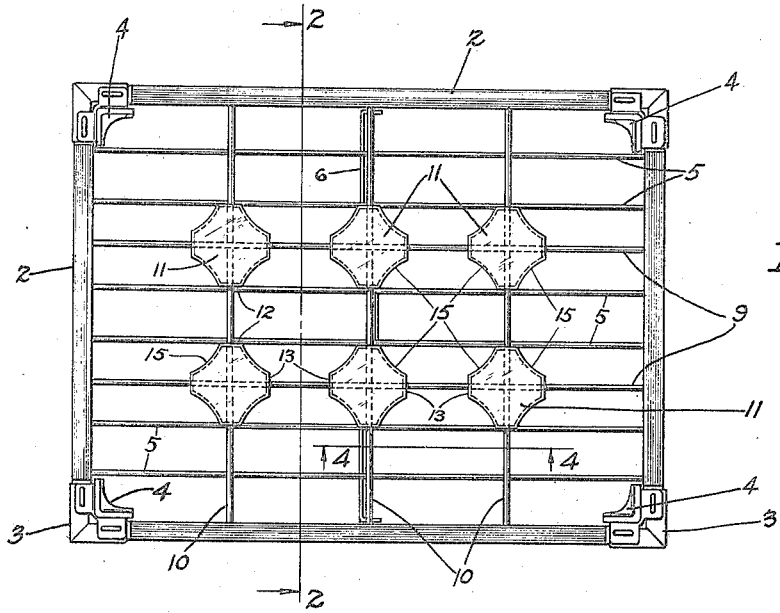
Fig. 1
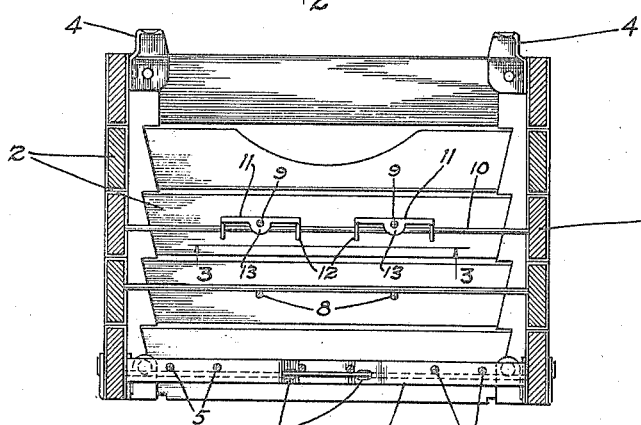
Fig. 2
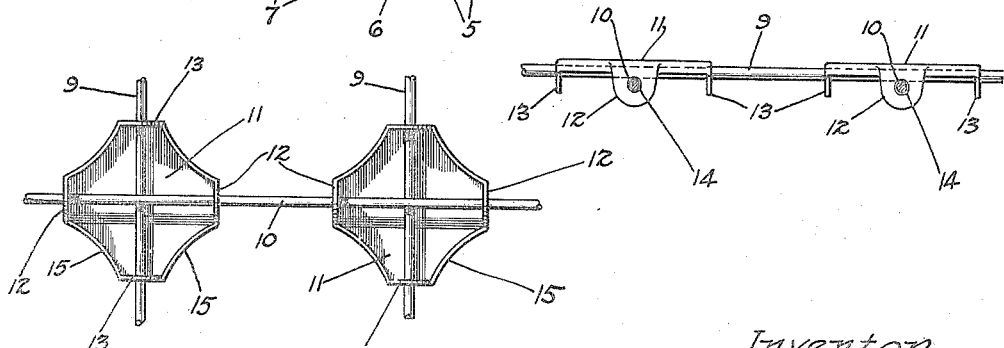
Fig. 3
Fig. 4
Inventor
CHARLES A. WOOLSEY
By Pauel Pauel
His Attorneys Patented Oct. 24, 1922.

1,433,327

UNITED STATES PATENT OFFICE.

CHARLES A. WOOLSEY, OF MINNEAPOLIS, MINNESOTA.

MILK CRATE.

Application filed October 31, 1921. Serial No. 511,555.

*To all whom it may concern:*

Be it known that I, CHARLES A. WOOLSEY, a citizen of the United States, resident of Minneapolis, county of Hennepin, State of Minnesota, have invented certain new and useful Improvements in Milk Crates, of which the following is a specification.

The object of my invention is to provide a milk crate having means for supporting the bottles in an upright position therein, with provision for supporting crushed ice in the space or angle between the adjacent rows of bottles.

A further object is to provide a crate of comparatively simple construction and one which will be strong and durable and especially adapted for the purpose designed.

In the accompanying drawings forming part of this specification,

Figure 1 is a plan view of a milk crate embodying my invention,

Figure 2 is a vertical sectional view on the line 2—2 of Figure 1,

Figure 3 is a detail view on section line 3—3 of Figure 2,

Figure 4 is a sectional view on the line 4—4 of Figure 1.

In the drawing, the crate is shown composed of side and end walls made up of a series of slats or bars 2 having reinforced corners 3, as usual in crates of this type. Ears 4 at the top of the crate provide means for holding the crates in alinement when they are piled one upon another. The bottom of the crate is open except for a series of parallel rods 5 extending from end to end therein and whereon the milk bottles to be transported are seated. These rods are preferably provided with a reinforcing plate 6 through which the rod at the middle portion of the crate is threaded in holes 7. Above these rods 5 are similar rods 8 extending parallel with the lower ones and forming guides for the bottles inserted into the crate.

Near the middle portion of the crate I provide longitudinal and transverse rods 9 and 10 dividing the interior of the crate into a series of pockets into which the bottles of milk are placed, resting upon the rods 5 at the bottom. The rods 9 and 10 contact at their points of intersection and here I provide flat plates 11, preferably of metal, having preferably downwardly turned ears 12 and 13 provided with holes 14 through which the rods 9 and 10 are inserted and thereby the plates are rigidly held against movement in either direction. Between the ears concave edge surfaces 15 are provided, conforming substantially to the curvature of the walls of the bottles and when the bottles are placed in the pockets, their walls will fit these curved edges 15 and the flat upper surfaces of the plates 11 between the adjoining bottles will form ice ledges or surfaces whereon cracked ice may be placed and kept during transportation. The position of the plates brings the body of ice at the cream line substantially, this being the point where the lower temperature is desired, and as there is considerable space between the plates and the tops of the bottles, it is evident that quite a considerable quantity of ice can be placed in these pockets and the gaps around the plates being closed substantially by the walls of the bottles, practically none of the crushed ice can escape and be wasted.

I generally prefer to adapt this crate for quart milk bottles, but the idea can be incorporated in crates adapted for other sizes of bottles, and while I have shown the partition rods passing through apertures in the plates, other means may be provided for attaching these plates, such as having slots in the depending ears to receive the rods. This would be a convenient method of mounting the plates on the rods, but there would be danger of the plates being pulled off and lost, while if they are mounted, as shown in the drawing, they become a permanent part of the structure. I do not, however, wish to confine myself to any particular manner of mounting the plates on the rods, the essential feature being the use of plates of this type adapted to form a support for the crushed ice between the bottles.

I claim as my invention:

1. A crate comprising side and end walls and rods extending transversely and longitudinally within said crate and connecting said walls and dividing the interior of said crate into a series of vertical pockets adapted to receive bottles in an upright position, and plates mounted on said rods at their point of intersection and having concave edges for contact with the walls of the bottles and conforming substantially to the curvature of the walls of the bottles and said plate being adapted to support crushed ice between the bottles.

2. A crate comprising side and end walls and rods extending transversely and longitudinally within said crate and connecting said walls and dividing the interior of said crate into a series of vertical pockets adapted to receive bottles in an upright position, and plates mounted on said rods at their points of intersection and having edges for contact with the walls of the bottles and adapted to support crushed ice between the bottles, and said plates having depending ears with aperatures therein through which said rods are inserted.

3. A crate comprising side and end walls and rods extending transversely and longitudinally within said crate and connecting said walls and dividing the interior of said crate into a series of vertical pockets adapted to receive bottles in an upright position, and plates mounted on said rods at their points of intersection and adapted to support crushed ice between the bottles, said plates having depending ears with apertures therein through which said rods are inserted, and also having concave surfaces between said ears conforming to the curvature of the walls of the bottles.

In witness whereof, I have hereunto set my hand this 27th of October, 1921.

CHARLES A. WOOLSEY.